United States Patent [19]
Parsons

[11] Patent Number: 5,079,821
[45] Date of Patent: Jan. 14, 1992

[54] MATRIX-SUPPORTED MACHINING OF SLENDER PARTS

[75] Inventor: Robert S. Parsons, Lakeland, Fla.

[73] Assignee: John T. Parsons, Traverse City, Mich.

[21] Appl. No.: 461,845

[22] Filed: Jan. 8, 1990

[51] Int. Cl.[5] .......................... B23C 3/00; B23Q 3/00
[52] U.S. Cl. ........................................ 29/424; 29/558; 51/322; 409/131
[58] Field of Search ................ 269/7; 409/131, 132, 409/136; 51/266, 322, 356; 29/424, 558; 408/1 R

[56] References Cited

U.S. PATENT DOCUMENTS

| | | | |
|---|---|---|---|
| 3,093,370 | 6/1963 | May et al. | 269/7 |
| 3,413,708 | 12/1968 | Norville et al. | 29/424 X |
| 3,790,152 | 2/1974 | Parsons | 269/7 |
| 4,005,635 | 2/1977 | Feldcamp | 409/132 |
| 4,513,538 | 4/1985 | Wolters et al. | 51/322 X |
| 4,629,378 | 12/1986 | Parsons | 409/131 |
| 4,730,382 | 3/1988 | Parsons | 269/7 |

FOREIGN PATENT DOCUMENTS

| | | | |
|---|---|---|---|
| 1164937 | 3/1964 | Fed. Rep. of Germany | 269/7 |
| 0001473 | 1/1979 | Japan | 29/424 |
| 1227373 | 4/1986 | U.S.S.R. | 409/132 |

Primary Examiner—Z. R. Bilinsky
Attorney, Agent, or Firm—Jerome A. Gross

[57] ABSTRACT

Meltable matrix chucking is utilized for support of exceptionally slender webs, ribs and flanges, against the forces of machining. The proces is of particular utilization in forming light-weight aircraft parts integrally.

9 Claims, 2 Drawing Sheets

MATRIX-SUPPORTED MACHINING OF SLENDER PARTS

BACKGROUND OF THE INVENTION

1. Field of the Invention

This invention relates to meltable-matrix support of workpieces from which slender structural elements are machined, and particularly to procedures for machining such workpieces.

2. Description of Related Art

Programmed milling machines are conventionally utilized to mill workpiece blanks, such as forgings, castings, bars or plate, to as close to final contour as the capability of the machine and the manner it supports the workpiece will permit. Workpieces may be clamped at localized points; if so the workpieces may flex so markedly under the forces of machining as to defy machining to final contour. Extreme warping of castings and forgings during machining may also occur when "locked in" stresses (those attendant to cooling) are relieved as one surface is machined and released preliminary to reclamping for machining an opposite surface; such warping makes it virtually impossible to machine the opposite surface to final contour in a single programmed operation. Also, the surface areas obstructed by clamps cannot be machined without reclamping the workpiece at other points.

Matrix support during machining is shown in the prior art as applied to machining airfoil-shaped turbine blades. A blade blank is first supported by embedding one adhesive-coated surface in the meltable matrix of a first pallet; then, after machining the opposite surface and coating it with adhesive, a second meltable matrix pallet receives and embeds such opposite surface at a programmed spacing from the first pallet. The matrix of the first pallet is then melted away to permit machining of the theretofore embedded surface.

By this procedure the workpiece is prevented from flexing as "locked in" stresses are released during the first machining. The procedure is disclosed in U.S. Pat. Nos. 3,790,152, 4,629,378 and 4,730,382, the latter two patents showing a chucking center which, among its other functions, sets the precise spacing of such pallets from each other for transfer of the workpiece so that an integrated machining program may proceed to completion.

SUMMARY OF THE INVENTION

The present invention teaches how to utilize such matrix support to machine to completion metal parts demarked and surrounded by integral thin webs, ribs and flanges, for example aircraft bulkheads and wing ribs. To machine such parts, which are sometimes herein referred to as "pocketed," the meltable matrix chucking process is here supplemented by new steps. These include adhesively coating and filling machined pockets with the same melted matrix material and, after it hardens in them and with the hardened material as a "back-up," machining the thin edge flanges and intermediate rib portions, supported against deflection by the fills of matrix material within such pockets. By reducing the rate of cutting as webs are machined to final thinness and by using liquid coolant copiously, the shear and compressive resistance offered by the matrix material permits machining to thickness as little as say 0.010". The result is to produce integral slender parts, to a thinness and precision not heretofore possible, and with the consequent advantages of light weight with great strength and resistance to fatigue failure.

Before embedding with matrix material, the underface of a blank to be machined is coated with a heat-curing adhesive and spaced closely above a chuck or pallet. Since the material, typically an alloy of tin, lead and bismuth, solidifies at about 158° F. (or in any event above 145° F.) and melts at a temperature of about 170° F., or somewhat below 180° F., it may be liquefied and solidified by previously known procedures, as those of the above-mentioned patents. While such matrix metals do not have the strength of conventional structural metals, nevertheless the bond shear strength of the adhesive of about 1480 psi—when used with matrix metal which has a tensile strength of about 4,000 psi and a compressive strength of about 7,000 psi—is adequate to support metal parts during machining.

For lateral support of slender flanges and ribs against the forces of machining, the new steps which make unique utilization of such matrix material include the following: A workpiece, oversize in plan form, is machined with pockets whose edges define the final inner edges of a slender outer flange; then these pockets are coated with adhesive and filled with the same meltable matrix material as used to chuck the part in the pallets. After this filled material solidifies, it provides resistance against bending deflection under the forces applied when thereafter the originally oversized workpiece is trimmed to final exterior dimension, leaving the flange as thin as desired. The fill of matrix material in the pocket is then melted out.

For forming slender trussing ribs in the workpiece, an analogous procedure is utilized. Assuming that some of these border the edge of the workpiece, all non-adjacent portions which are to be pocketed are first machined to their final depth and final rib edge and outer edge dimensions; then these pockets are coated with adhesive and filled with the matrix metal. The intermediate portions to be pocketed are then machined to final depth, rib edge and outer edge dimensions; the fill of matrix material in the previously machined pockets on the opposite sides of the slender ribs support the ribs against bending deflection during such machining. Assuming the finally machined workpiece is to be symmetrical about a central web, the pockets in these intermediate portions are adhesive-coated and filled also; the exposed side of the filled workpiece is now coated with the adhesive and the workpiece is transferred to a second pallet positioned opposite to the first. Then the same steps are repeated on the opposite, previously unmachined side, the bases of the pockets now form the web of the trusslike structure. Finally, with the workpiece still supported in the second pallet, the excess material around the outer edge of the workpiece is trimmed away to final exterior dimension. When this has been accomplished, all the matrix material—in the pockets on both sides of the workpiece as well as that which holds the workpiece to the second pallet—is melted away, giving up the finally machined rib.

BRIEF DESCRIPTION OF THE DRAWINGS

FIGS. 3-1 to 3-12 inclusive illustrate a cross-section, taken along line 3—3 of FIG. 2, of the nose rib of FIG. 2 at successive steps of the present process, as hereinafter described.

DESCRIPTION OF THE PREFERRED EMBODIMENT

Figure 1:
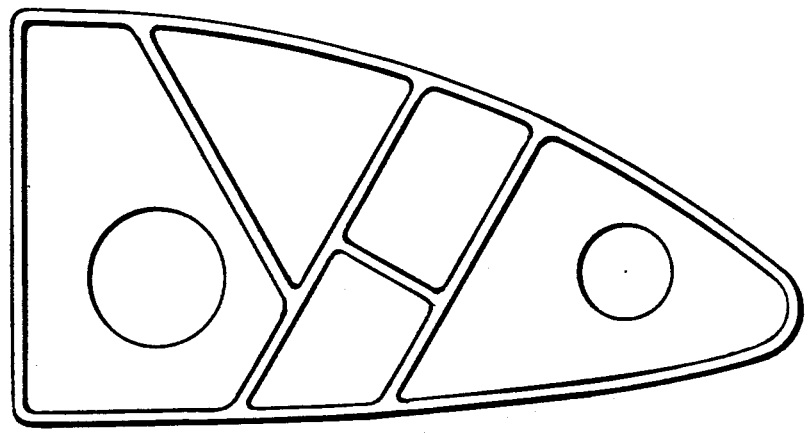
FIG. 1 is a plan view of a slender part suited for making by the process of the present invention, specifically a flanged semi-trussed wing nose rib for aircraft.

While the present invention is suited for making a wide variety of products, it is anticipated that the principal utilization will be in the field of aircraft parts where high strength, low weight and fatigue resistance are of principal concerns. Typical of such parts is the airfoil nose rib illustrated in plan form in FIG. 1. Such a nose rib may be formed symmetrically about a central plane, with integral edge flanges and integral truss-like cross ribs as shown. The method for chucking and machining such a part, so that its edge flanges and trussing ribs may be formed integrally, is essentially the same whether the trussing is somewhat complex, as shown in FIG. 1, or simplified as in FIG. 2. Accordingly, the description which follows is directed at the article shown in FIG. 2 rather than that in FIG. 1.

Figure 2:
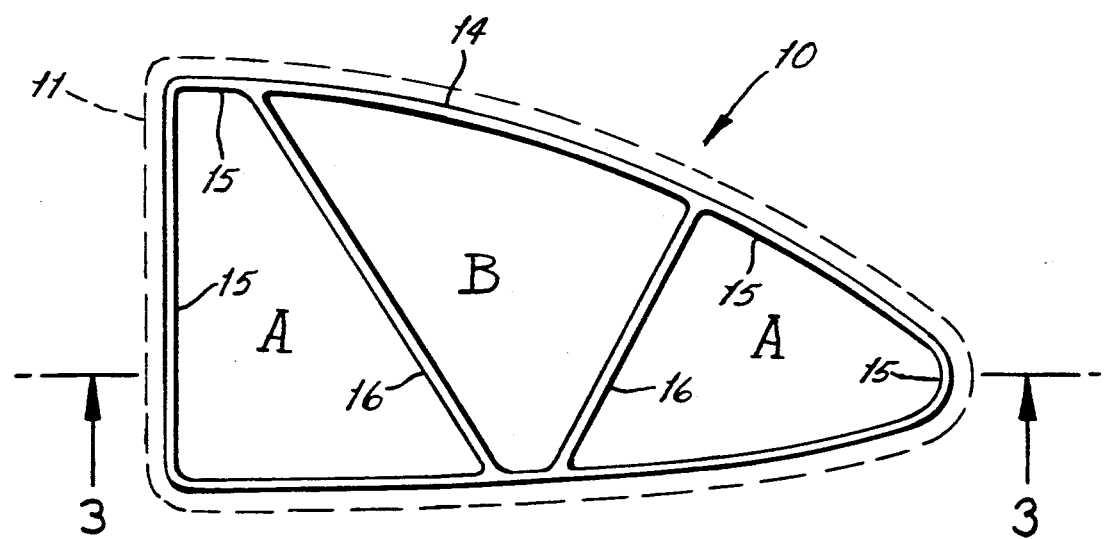
FIG. 2 is a view of a somewhat simplified trussed nose rib generally corresponding to FIG. 1. The dashed lines show the edge outline of a flat blank, oversize in plan form, from which this nose rib is to be machined.

Referring to FIG. 2: the workpiece to be machined generally designated 10 may be an aluminum blank of constant thickness. Initially it has an outward edge, shown in dashed lines as 11, which extends beyond the edge flange 14 of the final part; this initial edge 11 is of sufficient width to furnish support against deflection while machining the inner side surfaces of the slender outer edge flanges 12, as hereinafter described. The two noncontiguous pockets A and the single intervening pocket B are separated by internal trussing ribs formed by the generally parallel rib walls 16. Their flange walls 14 and rib walls 16 of the pockets A, B, extend inward somewhat less than half the thickness of the workpiece blank 10 to their web surfaces 18, 20 respectively.

While only one side of the workpiece 10 is shown in FIG. 2, it is to be understood that the opposite side is formed identically, with all of their portions being correspondingly identified followed in each case by the superscript '.

Figures 1, 3:
Figures 2, 3:
Figure 3:
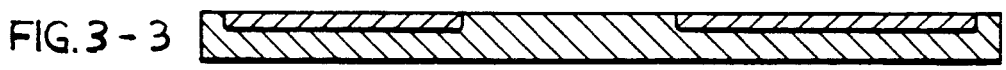

After chucking the oversize workpiece 10 in a first meltable matrix pallet in the manner disclosed by the patents hereinabove set forth, the successive process steps are the -1 to -12 steps as illustrated in FIG. 3-1 to 3-12, each as seen along line 3—3 of FIG. 2. Summarizing these steps:

FIG. 3-1: The underside of workpiece blank 10, oversize in plan form, is coated with adhesive; the coated side is then supported, embedded in and adhered to matrix material, in a first pallet.

FIG. 3-2: In the blank 10, the two non-contiguous pockets A are machined to a depth which establishes the upwardpresented web surface 15 in these pockets; and the machining includes cutting to final dimension their edge portions which define the ribs 16, as well as the inner edge surfaces of the surrounding flange 14, which is supported against deflection by the edge material extending to the outline 11.

FIG. 3-3: The non-adjacent pockets A are now coated with adhesive, and then filled with melted matrix material.

Figures 3, 4:
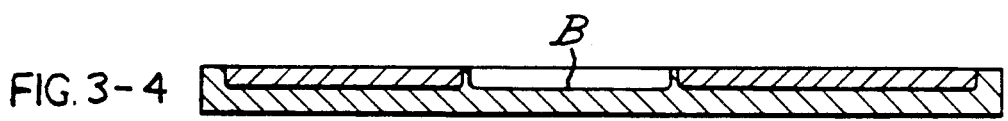

FIG. 3-4: Intervening pocket B is similarly milled. During this operation the matrix material in the adjacent pockets A so supports slender intermediate ribs 16, and the excess of width to the workpiece outline 11 so supports the outer flange 14, that the side surfaces in pocket B may be milled to final dimension.

The first pallet may now be removed from the milling machine.

Figures 3, 4, 5:
Figures 3, 4, 5, 6:
Figures 3, 4, 5, 6, 7:
Figures 3, 4, 5, 6, 7, 8:
Figures 3, 4, 5, 6, 7, 8, 9:
Figures 3, 4, 5, 6, 7, 8, 9, 10:
Figures 3, 4, 5, 6, 7, 8, 9, 10, 11:
Figures 3, 4, 5, 6, 7, 8, 9, 10, 11, 12:

FIG. 3-5: Pocket B is adhesively coated and filled with matrix material.

FIG. 3-6: The entire filled side of the workpiece 10 is coated with an adhesive. The first pallet holding the workpiece 10 is inverted; the workpiece transferred to, and its side so filled is embedded in matrix material of, a second pallet, all in the manner taught by the prior art. That procedure includes the following steps:

The first pallet is maintained chilled as it is positioned inverted at a small distance over the second pallet, which distance is precisely fixed according to their integrated or coordinated machining program. With the now coated machined workpiece surface presented downward by the first pallet, the second pallet is filled with matrix material to embed the coated workpiece surface; the workpiece at this stage has its opposite surfaces embedded in the two pallets. Their positions are now so changed that the first pallet may be subjected to heat, to melt away its matrix material; while the matrix in the second pallet is maintained chilled. The workpiece, supported in the second pallet is then returned to the milling machine for continuing the integrated machining program.

FIG. 3-7: Two pockets A', mirror images of the pockets A, are machined opposite the pockets A to the depth which establishes their bottoms at a chosen thickness from the web surfaces machined in pockets A. If this thickness is of the order of sheet metal thickness, say 0.064" or less, the machining feed and/or depth of cut may be lessened or liquid coolant may be used copiously to impose less stress and heat, avoiding melting which would lessen the shear resistance of the matrix material adjacent to the opposite web surface. This procedure permits machining to thicknesses as little as say 0.010".

FIG. 3-8: Pockets A' are adhesively coated and filled with matrix material which is hardened or permitted to harden.

FIG. 3-9: Pocket B' is machined opposite pocket B, to the same outline. In machining its depth, the same controls and precaution are exercised as with pocket A'.

FIG. 3-10: Pocket B' is coated with adhesive and filled with matrix material which is hardened.

FIG. 3-11: With all the pockets A, B, A', B' filled with matrix material to support their flange edges, the excess edge material around the entire blank is machined away, leaving the surrounding flange 14 at its final slenderness.

FIG. 3-12: All matrix material including that in pockets A, B, A' and B' and that in the second pallet, is melted away, forming the fully machined nose rib from which the remaining adhesive is removed by soaking in commercially available liquid remover.

As applied to pocketed bulkheads which are flanged only on a single side, the procedure is more simple, as will be apparent. Assuming the original underside of the workpiece is preliminarily machined flat, all that is required are the steps corresponding to those of FIGS. 3-1, 3-2, 3-3, 3-4, 3-5, 3-11 and 3-12. If the original underside has not been so machined to finished thickness, the workpiece is transferred to a second pallet as in FIGS. 3-6 and that original underside is machined. If such a part require straightening, the slender flanges may be protected by first re-filling the pockets with the matrix material.

It is understood that fillets corresponding to those shown in FIG. 2 are machined according to the machining program, and that other portions such as bosses and lands may be included.

The present invention thus provides integral components designed as required to resist high applied loads and repetitions of loading, with great weight savings.

As various modifications may be made in the constructions herein described and illustrated without departing from the scope of the invention, it is intended that all matter contained in the foregoing description or shown in the accompanying drawings shall be interpreted as illustrative rather than limiting.

I claim:

1. The method of machining a metal workpiece to form a structural part having a pocket portion bounded at least in part by a flange of such thinness as to be insufficient of itself to withstand the forces of machining, comprising the steps of selecting a metal workpiece having two principal surfaces and larger in plan form than such bounding flange, positioning such workpiece with one of its said principal surfaces closely above a pallet of the meltable matrix chucking type, applying between such pallet and metal workpiece surface a fill of molten meltable matrix material, and mounting the workpiece onto such pallet by cooling such matrix material thereby causing it to solidify, machining, into the workpiece face portion presented away from such pallet, a pocket whose outer edge substantially defines at least in part an inner edge of such bounding flange to be machined, applying onto the surface of the pocket so machined a fill of molten meltable matrix material, and causing such material to solidify, then machining outward of such filled pocket edge at a spacing equal to that of the flange to be formed, whereby the solidified matrix material in the pocket aids in resisting the forces of machining, and then so heating the meltable matrix material, including that in such pocket, as to cause it to melt sufficiently to empty the pocket and to release the workpiece from the pallet.

2. The method as defined in claim 1 in which, prior to said steps of applying a fill of melted matrix material, such workpiece surface and pocket surfaces are coated with an adhesive to which said melted matrix material may adhere.

3. The method of machining a metal workpiece to form a structural part having a plurality of pocket portions separated by a rib of such chosen thinness as to be insufficient of itself to withstand the forces of machining, comprising the steps of selecting a metal workpiece having two principal surfaces, positioning such workpiece with one of its said principal surfaces closely above a pallet of the meltable matrix chucking type, applying between such pallet and workpiece surface a fill of molten meltable matrix material, and mounting the workpiece onto such pallet by cooling such matrix material thereby causing it to solidify, machining, into the workpiece surface presented away from such pallet, a first pocket having an edge portion which substantially defines an edge of such separating rib to be machined, applying onto the surface of the first pocket so machined a fill of molten meltable matrix material, and causing such material to solidify, then machining adjacent to such pocket edge portion, at a spacing equal to the thickness chosen for such separating rib, a second pocket, whereby the solidified matrix material in such first pocket aids in resisting the forces of machining, and then so heating the meltable matrix material, including that in such first pocket, as to cause it to melt sufficiently to empty said pocket and to release the workpiece from the pallet.

4. The method as defined in claim 3 in which, prior to said steps of applying a fill of melted matrix material, such workpiece surface and pocket surfaces to which applied are coated with an adhesive to which said melted matrix material may adhere.

5. The method of machining a metal workpiece to form a structural part having a substantially central web, and on each side thereof a pocket portion, the structural part being bounded at least in part by a flange of such thinness as to be insufficient of itself to withstand the forces of machining, comprising the steps of selecting a metal workpiece having two principal surfaces and larger in plan form than such bounding flange, positioning such workpiece with its under principal surface closely above a first pallet of the meltable matrix chucking type, applying between such first pallet and such workpiece under surface a fill of molten meltable matrix material, and mounting the workpiece onto such pallet by cooling such matrix material thereby causing it to solidify, machining, into the workpiece upper surface presented away from such pallet, a pocket whose bottom forms a surface portion of such central web and whose outer edge substantially defines at least in part an inner edge of such bounding flange to be machined, applying onto the pocket so machined a fill of molten meltable matrix material, and causing such material to solidify, then transferring the workpiece to a second such pallet by inverting the workpiece so mounted and positioning its now pocketed inverted surface closely above such second pallet and, while maintaining said first pallet cooled retaining said workpiece and the fill in said pocket, applying, between such second pallet and the workpiece inverted surface a fill of molten meltable matrix material and causing such material to solidify, and then melting away the fill of matrix material in such first pallet and thereby releasing the workpiece original under surface from such first pallet, then machining into such workpiece original under surface a second pocket so positioned that its bottom forms an opposite surface portion of such central web and its outer pocket edge is in substantial registration with that of the pocket so machined on the opposite side of such web, thereby defining at least in part the inner edge of such bounding flange to be machined, applying onto the newly machined second pocket a fill of molten meltable matrix material, and causing such material to solidify, then machining the entire depth of the workpiece outward of such filled pocket edge at a spacing equal to the width of the flange to be formed, whereby the solidified material in such registering pockets aids in resisting the forces of machining, and then so heating the meltable matrix material, including that in both such pockets, as to cause it to melt sufficiently to empty the pockets and to release the workpiece from the pallet.

6. The method as defined in claim 5 in which, prior to said steps of applying a fill of melted matrix material, such workpiece and pocket surfaces to which applied are coated with an adhesive to which said melted matrix material may adhere.

7. The method of machining a metal workpiece to form a structural part having a substantially central web and on each side thereof a plurality of pocket portions separated by a rib of such thinness as to be insufficient of itself to withstand the forces of machining, comprising the steps of selecting a metal workpiece having two principal surfaces, positioning such workpiece with its under principal surface closely above a first pallet of the meltable matrix chucking type, applying between such first pallet and such metal workpiece under surface a fill of molten meltable matrix material, and mounting the workpiece onto such pallet by cooling such matrix material thereby causing it to solidify, machining, into the workpiece upper surface presented away from such pallet, a first pocket whose bottom forms a surface portion of such central web and having an edge portion which substantially defines an edge of such separating rib to be machined, applying onto the first pocket so machined a fill of molten meltable matrix material, and causing such material to solidify, then machining adjacent to such pocket edge portion, at a spacing equal to the thickness chosen for such separating rib, a second pocket, whereby the solidified matrix material in such first pocket aids in resisting the forces of machining, and then applying onto the second pocket so machined a fill of molten meltable matrix material, and causing such material to solidify, then transferring the workpiece to a second such pallet by inverting the workpiece so mounted and positioning its now pocketed inverted surface closely above such second pallet and while maintaining said first pallet cooled to retain said workpiece and the filled matrix material in its pockets, applying between such second pallet and the workpiece inverted surface a fill of molten meltable matrix material and causing such material to solidify, and then melting away the fill of matrix material in such first pallet and thereby releasing the workpiece original under surface from such first pallet, and then machining into the workpiece original under surface, a third pocket whose bottom forms a surface portion of such central web and one of whose edges substantially defines at least in part an edge of such separating rib to be machined, applying onto the third pocket so machined a fill of molten meltable matrix material, and causing such material to solidify, then machining adjacent to such pocket edge, at a spacing equal to the thickness chosen for such separating rib, a fourth pocket, whereby the solidified matrix material in such third pocket aids in resisting the forces of machining, and then so heating the meltable matrix material, including that in such pockets, as to cause it to melt sufficiently to empty the first, second and third pockets and to release the workpiece from such second pallet.

8. The method as defined in claim 7 in which, prior to said steps of applying a fill of melted matrix material, such workpiece and pocket surfaces to which applied are coated with an adhesive to which said melted matrix material may adhere.

9. In machining, from a blank having a surface chucked by a matrix of meltable material, a machined part having an integral flange substantially surrounding a web portion of such thinness that the heat of machining, passing therethrough, would tend to soften such matrix material on the opposite side thereof, the method of protecting the meltable matrix material against the heat of machining such web, comprising the step, commenced before such web machining progresses to such thinness that the heat of machining softens the matrix material, of flowing liquid coolant onto the web while being so machined, whereby the coolant so applied preserves the shear resistance of the matrix material adjacent to the opposite web surface.

* * * * *